United States Patent [19]

Nishimura et al.

[11] Patent Number: 5,303,050
[45] Date of Patent: Apr. 12, 1994

[54] VIDEO CAMERA APPARATUS

[75] Inventors: Yoshikazu Nishimura; Takashi Nakamura, both of Kanagawa, Japan

[73] Assignee: Sony Corporation, Tokyo, Japan

[21] Appl. No.: 887,902

[22] Filed: May 26, 1992

[30] Foreign Application Priority Data

May 23, 1991 [JP] Japan .................. 3-147994
May 27, 1991 [JP] Japan .................. 3-151019

[51] Int. Cl.⁵ .................................. H04N 5/30
[52] U.S. Cl. ................... 348/211; 348/513; 348/525; 348/537
[58] Field of Search ........... 358/148, 149, 210, 209, 358/141, 150, 151, 189, 25

[56] References Cited

U.S. PATENT DOCUMENTS

| | | | |
|---|---|---|---|
| 3,629,506 | 12/1971 | Brun | 178/69.5 |
| 3,814,854 | 6/1974 | Edwards | 358/149 |
| 4,101,926 | 7/1978 | Dischert et al. | 358/17 |
| 4,109,276 | 8/1978 | Hopkins, Jr. et al. | 358/4 |
| 4,110,785 | 8/1978 | Dischert et al. | 358/19 |
| 4,134,131 | 1/1979 | Hopkins, Jr. | 358/149 |
| 4,214,261 | 7/1980 | Bazin et al. | 358/19 |
| 4,333,103 | 6/1982 | Koiwa et al. | 358/19 |
| 4,626,914 | 12/1986 | Breimer | 358/148 |

FOREIGN PATENT DOCUMENTS 0202683 11/1986 European Pat. Off. ...... H04N 5/073
0420289 4/1991 European Pat. Off. ...... H04N 7/18

OTHER PUBLICATIONS

Electronics, vol. 41, No. 17, Aug. 19, 1968, New York US pp. 74–83; M. Kronenberg et al.: 'CBS nominates a convention hopeful'.

Primary Examiner—Joseph Mancuso
Assistant Examiner—Tuan V. Ho
Attorney, Agent, or Firm—William S. Frommer; Alvin Sinderbrand

[57] ABSTRACT

Disclosed is a video camera apparatus including a video camera for generating a video signal and a camera control unit for generating a control signal for controlling the video camera. The camera control unit includes a video signal receiver, a video/reference signal phase comparator, a phase difference signal transmitter, a video signal memory, and write and read clock signal generators. The video camera comprises a phase difference signal receiver, a synchronizing signal generator, a synchronizing signal phase controller, an image pickup device and a video signal transmitter. In this setup, the output video signal is generated under stable genlock control for radio communication between video camera and camera control unit.

14 Claims, 5 Drawing Sheets

VIDEO CAMERA APPARATUS

BACKGROUND OF THE INVENTION

1. Field of the Invention

The present invention relates to a video camera apparatus that permits exchanges of control signals and camera output signals between a video camera and a camera control unit over a radio channel.

2. Description of the Prior Art

Video cameras for use by broadcasting stations are each controlled by a separately provided camera control unit (called a CCU) in diaphragm opening and other settings. The camera is also controlled by the CCU so that the signal output by the camera will be synchronized with an externally furnished reference video signal (i.e., placed under genlock control).

During a camera-based program broadcast, each participating video camera is generally connected to its camera control unit via cables such as triax. In some cases, cable-based connections are unavailable between the video camera and the CCU; these physical connections are then replaced by radio communications.

The radio communications from each video camera to the CCU involve the use of a microwave circuit. On the other hand, control commands from the CCU to each video camera are transmitted over a radio channel for voice communication.

Conventional camera control systems in which video cameras are each connected to a CCU by radio communication have some disadvantages that are not experienced with the cable-based camera-to-CCU connection. Some of these disadvantages will be discussed below.

Where a video camera and a CCU are connected by cable, CCU-initiated control commands and camera-initiated commands are transmitted bidirectionally therebetween. That is, the CCU transmits control commands to the camera over the cable. In turn, the video camera sends to the CCU over the same cable such commands as a camera status signal (defining camera diaphragm setting, etc.) and a call command by which the camera operator calls up the CCU.

Where the video camera and the CCU are connected by radio channel, the commands are transmitted unidirectionally, i.e., only from the CCU to the camera as described. It is impossible for the camera to send the camera status signal, call command or other commands to the CCU over the radio channel.

The radio channel for control command transmission is a voice communication radio channel. This means that when a genlock reference signal is sent to the camera over the radio channel, genlock control becomes very vulnerable to external disturbances. With the genlock control signal sent over the conventional voice communication radio channel, the genlock system is markedly susceptible to Doppler shifts. Furthermore, the lock range is narrow and phase jitter plentiful with the genlock system. Thus the genlock of the output video signal is much less stable with the radio-based connection between camera and CCU than with the cable-based connection therebetween.

SUMMARY OF THE INVENTION

It is therefore an object of the present invention to provide a video camera apparatus capable of generating an output video signal under stable genlock control for radio communication between camera and CCU.

In carrying out the invention and according to one aspect thereof, there is provided a video camera apparatus including a video camera for generating a video signal and a camera control unit for generating a control signal for controlling the video camera, the camera control unit comprising: first receiving means for receiving a video signal transmitted from the video camera; means for comparing the relative phase of a video signal received by the first receiving means with that of a reference signal so as to generate a phase difference signal from between the two signals; first transmitting means for transmitting the phase difference signal to the video camera over a radio channel; memory means for storing the video signal received by the first receiving means; means for generating a write clock signal in response to the video signal received by the first receiving means so that the video signal is written to the memory means; means for generating a read clock signal in response to the reference signal so that the video signal is read out from the memory means; the video camera comprising: second receiving means for receiving the phase difference signal transmitted from the camera control unit; means for generating a synchronizing signal; means for controlling the phase of the synchronizing signal in accordance with the phase difference signal received by the second receiving means; image pickup means for generating the video signal in accordance with the synchronizing signal; and second transmitting means for transmitting the video signal over a radio channel.

According to another aspect of the invention, there is provided a camera control unit for generating a control signal for controlling a video camera, the camera control unit comprising: means for receiving a video signal transmitted from the video camera over a radio channel; means for comparing the relative phase of the video signal received by the receiving means with that of a reference signal so as to generate a phase difference signal from between the two signals; transmitting means for transmitting the phase difference signal to the video camera over a radio channel; memory means for storing the video signal received by the receiving means; means for generating a write clock signal in response to the video signal received by the receiving means so that the video signal is written to the memory means; and means for generating a read clock signal in response to the reference signal so that the video signal is read out from the memory means.

Further objects, features and advantages of the invention will become more apparent upon a reading of the following description and appended drawings.

DESCRIPTION OF THE PREFERRED EMBODIMENT

Figure 1:
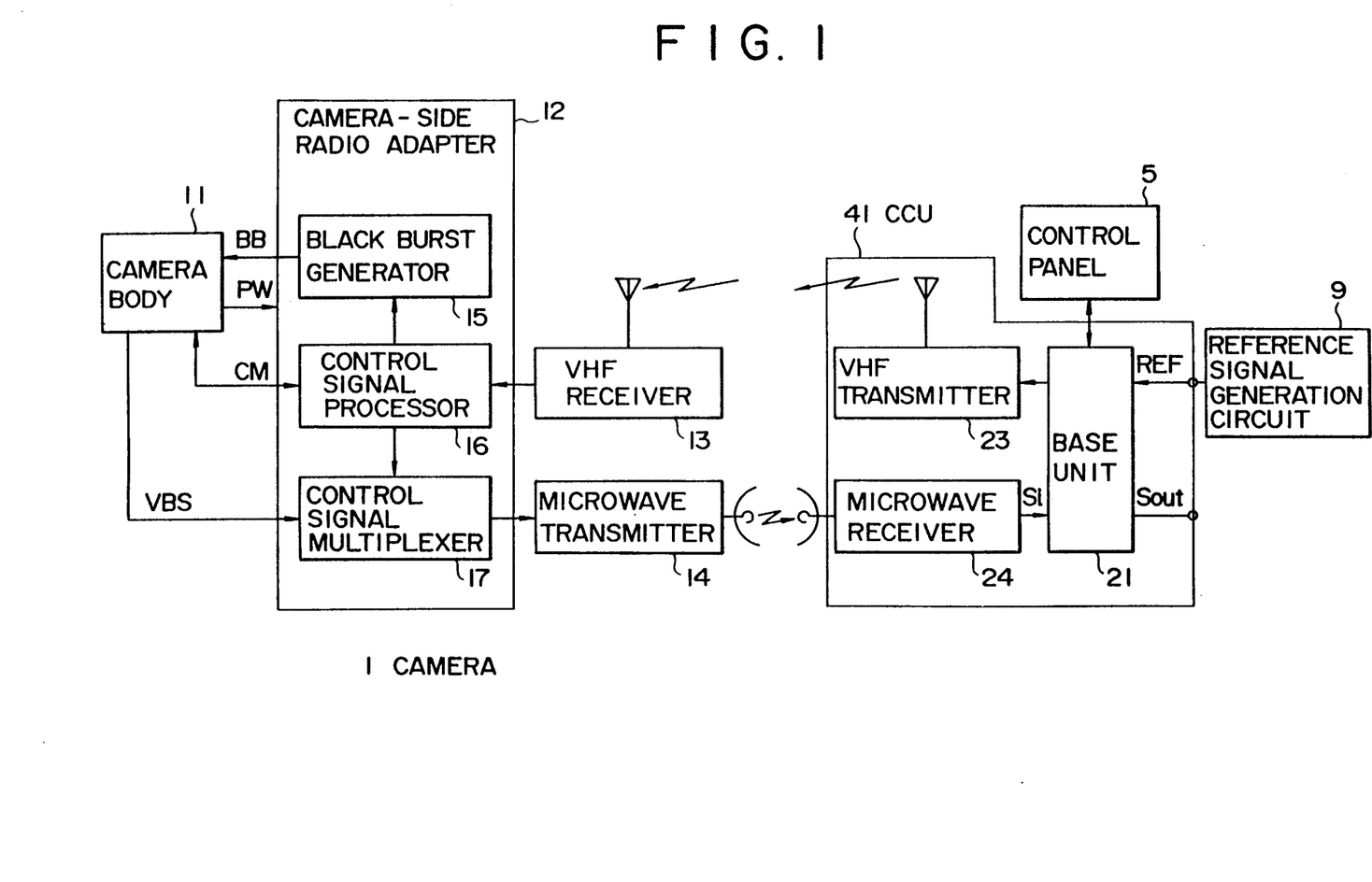
FIG. 1 is a block diagram of a camera control unit according to the invention.

FIG. 1 is a block diagram of a camera control unit (CCU) according to the invention. In FIG. 1, reference numeral 1 is a video camera; 41 is the CCU; and 5 is a control panel for operating the CCU 41. The video camera 1 comprises a camera body 11, a camera-side radio adapter 12, a VHF receiver 13, and a microwave transmitter 14 for transmitting the camera output to the CCU 41. The camera body 11 supplies power PW to the camera-side radio adapter 12. The camera-side radio adapter 12 contains a black burst generator 15, a control signal processor 16 and a control signal multiplexer 17.

The CCU 41 comprises a base unit 21, a VHF transmitter 23, and a microwave receiver 24 that receives signals sent from the microwave transmitter 14 of the video camera 1.

The VHF transmitter 23 of the CCU 41 gets a command signal from the base unit 21 and subjects it illustratively to SSB (single-side-band) modulation for transmission to the video camera 1. Furthermore, the VHF transmitter 23 supplies the video camera 1 through SSB modulation with a frame error signal $\Delta V$ indicating the line divergence per frame of the camera output with respect to a reference video signal REF (supplied illustratively by a reference video signal generation circuit 9), as will be described later.

The VHF receiver 13 of the video camera 1 receives and demodulates the output from the VHF transmitter 23. The demodulated output is sent to the control signal processor 16 of the camera-side radio adapter 12. The control signal processor 16 decodes the command signal based on the control signal from the CCU 41, and forwards the decoded command signal to the camera body 11. The command signal, upon receipt by the camera body 11, controls it as designated. The control signal processor 16 sends the frame error signal $\Delta V$ to the black burst generator 15.

In turn, the black burst generator 15 generates a black burst signal BB made of a synchronizing signal and a burst signal, the latter acting as a color synchronizing signal. Upon receipt of the frame error signal $\Delta V$ from the control signal processor 16, the black burst generator 15 generates a black burst signal BB in accordance therewith. In this case, the black burst signal BB is synchronized substantially with the genlock-controlled output from the CCU 41.

The black burst signal BB from the black burst generator 15 is fed to a genlock black burst signal input terminal of the camera body 11. Given the black burst signal BB, the camera body 11 outputs a camera output video signal VBS in accordance therewith. The video signal VBS is supplied to the control signal multiplexer 17 of the radio adapter 12.

In addition, the camera body 11 returns to the control signal processor 16 a status signal indicating the status the camera is in upon receipt of the control signal. The control signal processor 16 feeds the status signal to the control signal multiplexer 17. In turn, the control signal multiplexer 17 multiplexes the status signal illustratively into vertical blanking periods of the video signal VBS. If, for example, the camera operator pushes a call switch, a call command signal is sent by the control signal processor 16 to the control signal multiplexer 17 and is multiplexed into vertical blanking periods of the video signal VBS.

The signal from the control signal multiplexer 17 is fed to the microwave transmitter 14 for modulation into a microwave signal. The microwave signal is sent to the CCU 41. The microwave receiver 24 of the CCU 41 receives the signal, demodulates it, and supplies the demodulated signal to the base unit 21.

Figure 2:
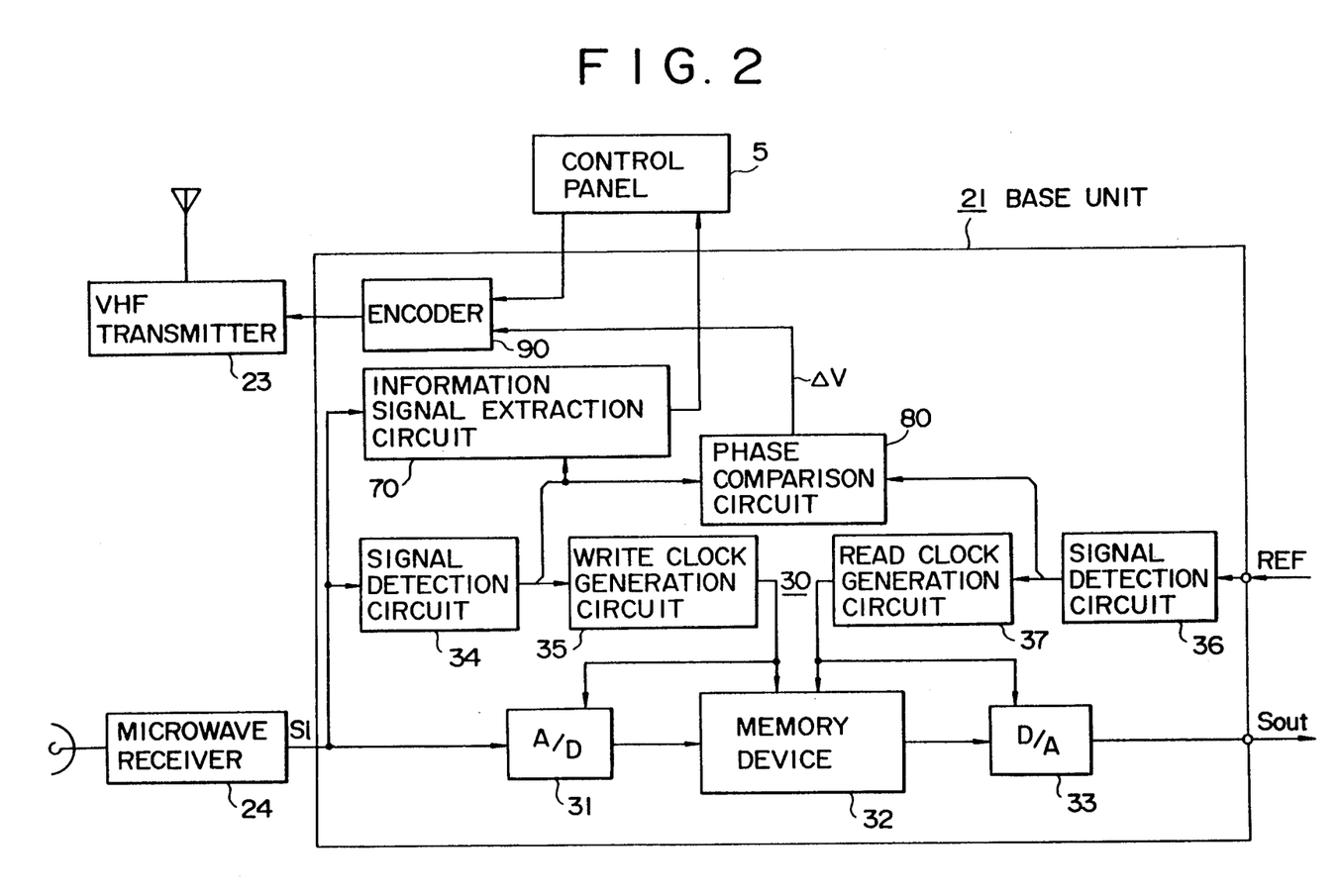
FIG. 2 is a block diagram of a base unit contained in the camera control unit of FIG. 1.

A typical construction of the base unit 21 is shown in FIG. 2. In FIG. 2, the base unit 21 comprises a synchronizing video signal generation circuit 30, an information signal extraction circuit 70, a phase comparison circuit 80 and an encoder 90. Based on the camera output received from the microwave receiver 24, the synchronizing video signal generation circuit 30 generates a video signal in synchronism with the reference video signal. The information signal extraction circuit 70 extracts the multiplexed additional information sent from the video camera 1. The phase comparison circuit 80 generates the frame error signal $\Delta V$ based on the discrepancy between the reference video signal REF directed to the video camera 1 on the one hand, and the camera output video signal VBS on the other. The encoder 90 encodes the control signal to be sent to the video camera 1.

The synchronizing video signal generation circuit 30 comprises an A/D converter 31, a memory device 32 having a two-field memory capacity, a D/A converter 33, signal detection circuits 34 and 36 for detecting the synchronizing signal and color burst signal from the video signal, a write clock generation circuit 35, and a read clock generation circuit 37.

A camera output video signal Si from the microwave receiver 24 is converted to digital format by the A/D converter 31. The digitized signal is then written to the memory device 32.

The camera output video signal Si from the microwave receiver 24 is also fed to the signal detection circuit 34. From the video signal Si, the signal detection circuit 34 detects the synchronizing signal and color burst signal. When detected, the synchronizing signal and color bust signal are supplied to the write clock generation circuit 35. The write clock generation circuit 35 generates a write clock signal in synchronism with the synchronizing signal and color bust signal detected from the video signal Si. The write clock signal is sent both to the A/D converter 31 and to the memory device 32. Thus writing of the video signal Si to the memory device 32 is accomplished using the write clock signal synchronized with the synchronizing and color bust signals contained in the video signal Si.

The reference video signal REF is supplied to the signal detection circuit 36 of the base unit 21. The signal detection circuit 36 detects the synchronizing signal and color bust signal from the reference video signal REF received. When detected, the synchronizing signal and color burst signal are sent to the read clock generation circuit 37. In turn, the read clock generation circuit 37 generates a read clock signal in synchronism with the synchronizing and color bust signals contained in the reference video signal REF. The read clock signal is fed both to the D/A converter 33 and to the memory device 32. Thus reading of the video signal from the memory device 32 is achieved using the read clock signal synchronized with the synchronizing and color burst signals contained in the reference video signal REF. In this manner, the output video signal Sout from the D/A converter 33 turns into a signal synchronized with the reference video signal REF (i.e., genlock-controlled).

The camera output video signal Si from the microwave receiver 24 is sent to the information signal extraction circuit 70 which also receives a synchronizing signal from the signal detection circuit 34. Using the synchronizing signal, the information signal extraction circuit 70 generates a gate signal for the information signal that is multiplexed in vertical blanking periods coming from the video camera 1. By so doing, the information signal extraction circuit 70 extracts from the video signal Si such additional signals as the information signal. After being extracted, the information signal and other signals are supplied to the control panel 5. In turn, the control panel 5 illustratively displays indications of the status check on the video camera 1 as well as a call indication corresponding to the call command.

Although the camera output video signal Si remains asynchronous with the reference video signal REF, the fact remains that the synchronizing signal of the camera output video signal Si is detected by the signal detection circuit 34 of the synchronizing video signal generation circuit 30 and that the gate signal for extracting information signal from the video camera 1 is generated based on that synchronizing signal. This makes it possible to extract reliably the information signal from the video camera 1, the command having being multiplexed in vertical blanking periods.

In the above example, the frame error signal $\Delta V$ representing the discrepancy between the signal Si and the reference video signal REF is transmitted as the control command. That is, the synchronizing signal of the camera output video signal from the signal detection circuit 34 and the synchronizing signal of the reference video signal REF from the signal detection circuit 36 are supplied to the phase comparison circuit 80 for phase comparison.

Figure 3:
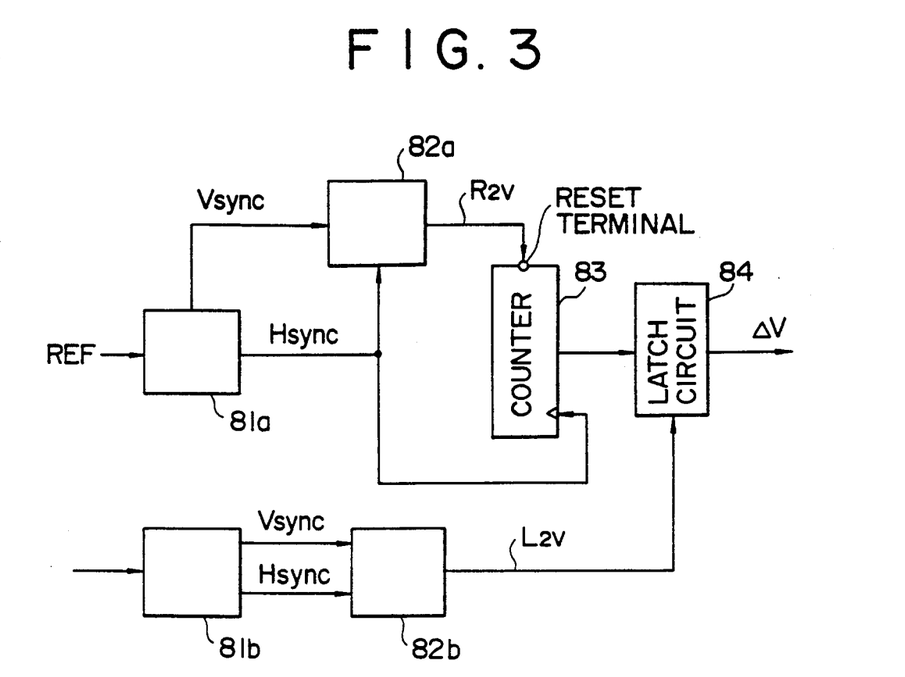
FIG. 3 is a block diagram of a phase comparison circuit included in the base unit of FIG. 2.

How the phase comparison circuit 80 operates illustratively on the NTSC principles will now be described with reference to FIG. 3. In FIG. 3, the reference video signal REF is fed to a vertical/horizontal synchronizing signal separation circuit 81a and is separated thereby into a vertical synchronizing signal Vsync(REF) and a horizontal synchronizing signal Hsync(REF). The two synchronizing signals obtained by the vertical/horizontal synchronizing signal separation circuit 81a are supplied to a one-frame rate signal generation circuit 82a. Under the NTSC system, the starting phase of the vertical synchronizing signal Vsync(REF) is half-cycle out of phase with that of the horizontal synchronizing signal Hsync(REF) between odd and even fields. This characteristic is utilized by the one-frame rate signal generation circuit 82a in acquiring a two-field rate signal, i.e., one-frame rate signal $R_{2V}$ from the vertical synchronizing signal Vsync(REF) and the horizontal synchronizing signal Hsync(REF).

The horizontal synchronizing signal Hsync(REF) is also fed to a counter 83 which counts the received signal for each frame. A reset terminal of the counter 83 is supplied with the one-frame rate signal $R_{2V}$ from the one-frame rate signal generation circuit 82a. The signal $R_{2V}$ clears the count of the horizontal synchronizing signal Hsync(REF) for each frame. The count on the counter 83 is sent to a latch circuit 84.

The synchronizing signal of the camera output video signal Si from the signal detection circuit 34 is fed to a vertical/horizontal synchronizing signal separation circuit 81b and is separated thereby into a vertical synchronizing signal Vsync(VIDEO) and a horizontal synchronizing signal Hsync(VIDEO). The vertical synchronizing signal Vsync(VIDEO) and the horizontal synchronizing signal Hsync(VIDEO) are sent to a one-frame rate signal generation circuit 82b. As with the one-frame rate signal generation circuit 82a, the circuit 82b provides a one-frame rate signal $L_{2V}$.

The latch circuit 84, supplied with the one-frame rate signal $L_{2V}$ from the one-frame rate signal generation circuit 82b, latches the count on the counter 83 per frame. The latched count is sent to the encoder 90 as the frame error signal $\Delta V$.

If there is a phase difference of at least one line between the reference video signal REF and the camera output video signal from the signal detection circuit 34, the latch circuit 84 latches the count on the counter 83 as long as that count is other than 0. The count at this point, output as the frame error signal $\Delta V$, indicates the number of out-of-phase lines between the reference video signal REF and the camera output video signal from the signal detection circuit 34.

If the phase difference between the reference video signal REF and the camera output video signal from the signal detection circuit 34 is less than one line, the latch circuit 84 latches the count on the counter 83 as soon as the counter 83 is reset by the one-frame rate signal $R_{2V}$. This time, the frame error signal is 0.

The frame error signal $\Delta V$ is supplied to the encoder 90. More specifically, the phase comparison circuit 80 obtains the frame error $\Delta V$ indicating the number of out-of-phase lines per frame between the two video signals. The frame error signal $\Delta V$ is then sent to the encoder 90. The encoder 90 encodes the frame error signal $\Delta V$ and sends the encoded result to the VHF transmitter 23 for SSB modulation. The modulated error signal is transmitted to the video camera 1.

The command signal from the control panel 5 is likewise fed to the VHF transmitter 23 via the encoder 90. In turn, the VHF transmitter 23 transmits the command signal to the video camera 1.

The radio adapter 12 of the video camera 1 has the control signal processor 16 decode the frame error signal $\Delta V$, as described earlier. The decoded frame error signal $\Delta V$ is supplied to the black burst generator 15. This causes the black burst signal BB to synchronize substantially in phase with the synchronizing signal of the reference video signal REF on the side of the CCU 41.

Figure 4:
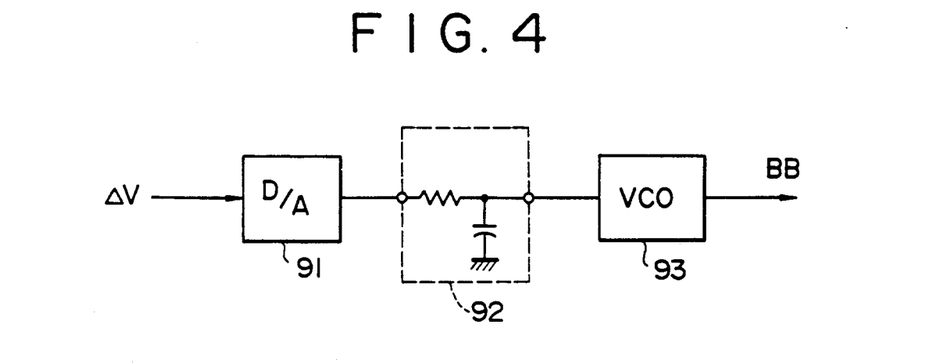
FIG. 4 is a circuit diagram of a black burst generator incorporated in the camera control unit of FIG. 1.

FIG. 4 shows a typical circuit construction of the black burst generator 15. In FIG. 4, reference numeral 91 is a D/A converter; 92 is a loop filter; and 93 is a voltage controlled oscillator. The frame error signal $\Delta V$ is first converted from digital to analog format by the D/A converter 91. The converted signal is supplied via the loop filter 92 to the voltage controlled oscillator 93. The voltage controlled oscillator 93 controls the oscillating frequency in accordance with the voltage supplied through the loop filter 92, whereby the black burst signal is generated. The loop filter 92, which provides a time constant, is incorporated here to remove noise elements contained in the frame error signal $\Delta V$. The black burst generator 15 thus controls the phase of the black burst signal in accordance with the frame error signal $\Delta V$.

As described, the system embodying the invention and connecting the CCU and the video camera by radio communication provides an output video signal Sout under stable genlock control. One modification of this embodiment is to transmit the frame error signal from the CCU to the camera not only in terms of the above-mentioned line divergence but also in terms of the phase difference between horizontal synchronizing signals.

Figure 5:
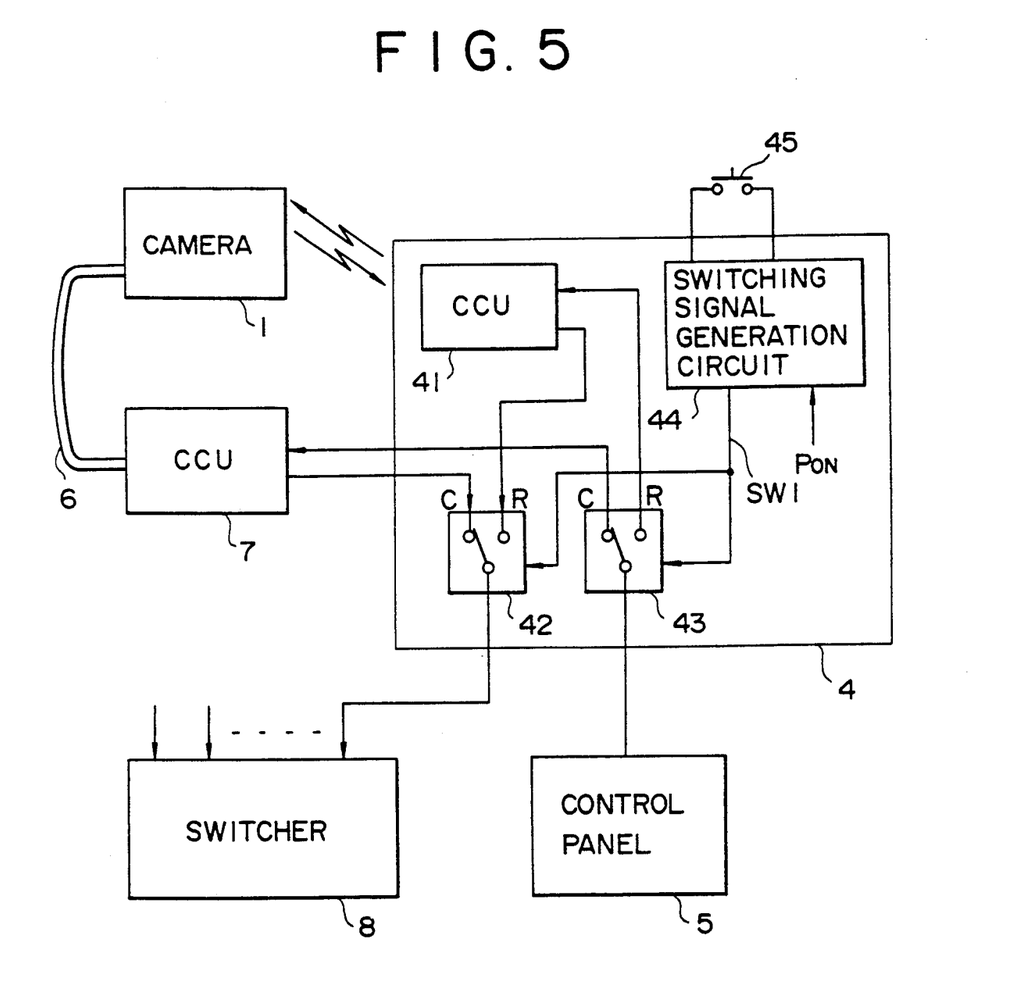
FIG. 5 is a block diagram of another camera control unit according to the invention, the unit being capable of transmitting control and camera output signals both by cable and over a radio channel.

FIG. 5 is a block diagram of another camera control unit according to the invention. This camera control unit is also capable of transmitting the control and camera output signals both by cable and over a radio channel. In FIG. 5 as well as in FIGS. 1 and 2, like reference numerals designate like or corresponding parts. Referring to FIG. 5, a switcher 8 typically receives video signals from a plurality of video cameras and switches these signals for transmission to monitor equipment. A control panel 5 is provided for each of the video cameras.

The video camera 1 is connected to a CCU 7 by cable 6. As with its counterpart in FIG. 1, the video camera 1 has a camera-side radio adapter 12 for communication over a radio channel with a radio adapter 4.

The CCU 7 supplies the video camera 1, through the cable 6, with such camera control signals as a genlock control signal and an diaphragm control signal. From the video camera 1, the CCU 7 receives through the cable 6 a genlock controlled video signal as well as a camera status signal for verifying the diaphragm setting and other camera status. Furthermore, the CCU 7 outputs the video signal through its output terminal.

The radio adapter 4 comprises a CCU 41, a video signal changeover switch 42, a control signal changeover switch 43 and a switching signal generation circuit 44.

As with its counterpart in FIGS. 1 and 2, the CCU 41 supplies the video camera 1 with such command signals as the frame error signal for genlock control and the diaphragm control signal, sent over a radio channel for voice communication. The command signals are modulated into VHF signals before being transmitted by radio to the video camera 1. The video signal from the video camera 1 is sent illustratively over a microwave channel. The video signal is received and demodulated by the CCU 41 for output through the output terminal thereof.

The input terminal C of the video signal changeover switch 42 in the radio adapter 4 receives the video signal from the CCU 7; the input terminal R of the switch 42 receives the video signal from the CCU 41. The video signal selected by the changeover switch 42 is fed to an input terminal corresponding to the camera number of the video camera 1 in question.

The command signal changeover switch 43 in the radio adapter 4 receives the command signal from the control panel 5. The command signal obtained at the output terminal C of the changeover switch 43 is sent to the CCU 7. The command signal obtained at the output terminal R of the changeover switch 43 is supplied to the CCU 41.

When the power switch of the radio adapter 4 is turned off, the changeover switches 42 and 43 are set to the input terminal C and to the output terminal C, respectively. The switching signal generation circuit 44 generates a switching signal SW1 for operating the changeover switches 42 and 43. The switching signal generation circuit 44 is supplied with a signal Pon that corresponds to the on-off action of the power switch of the radio adapter 4. The switching signal generation circuit 44 is connected with a manual switch 45. The status of the switching signal SW1 is determined by the signal Pon and by operation of the manual switch 45.

Specifically, turning on the power switch of the radio adapter 4 causes the switching signal SW1 to set the changeover switches 42 and 43 forcibly to the input terminal R and to the output terminal R, respectively.

When the manual switch 45 is pushed while the power switch is kept on, the changeover status of the switches 42 and 43 is reversed. When the power switch of the radio adapter 4 is turned off, the switching signal SW1 sets the changeover switches 42 and 43 forcibly to the input terminal C and to the output terminal C, respectively.

Figure 6:
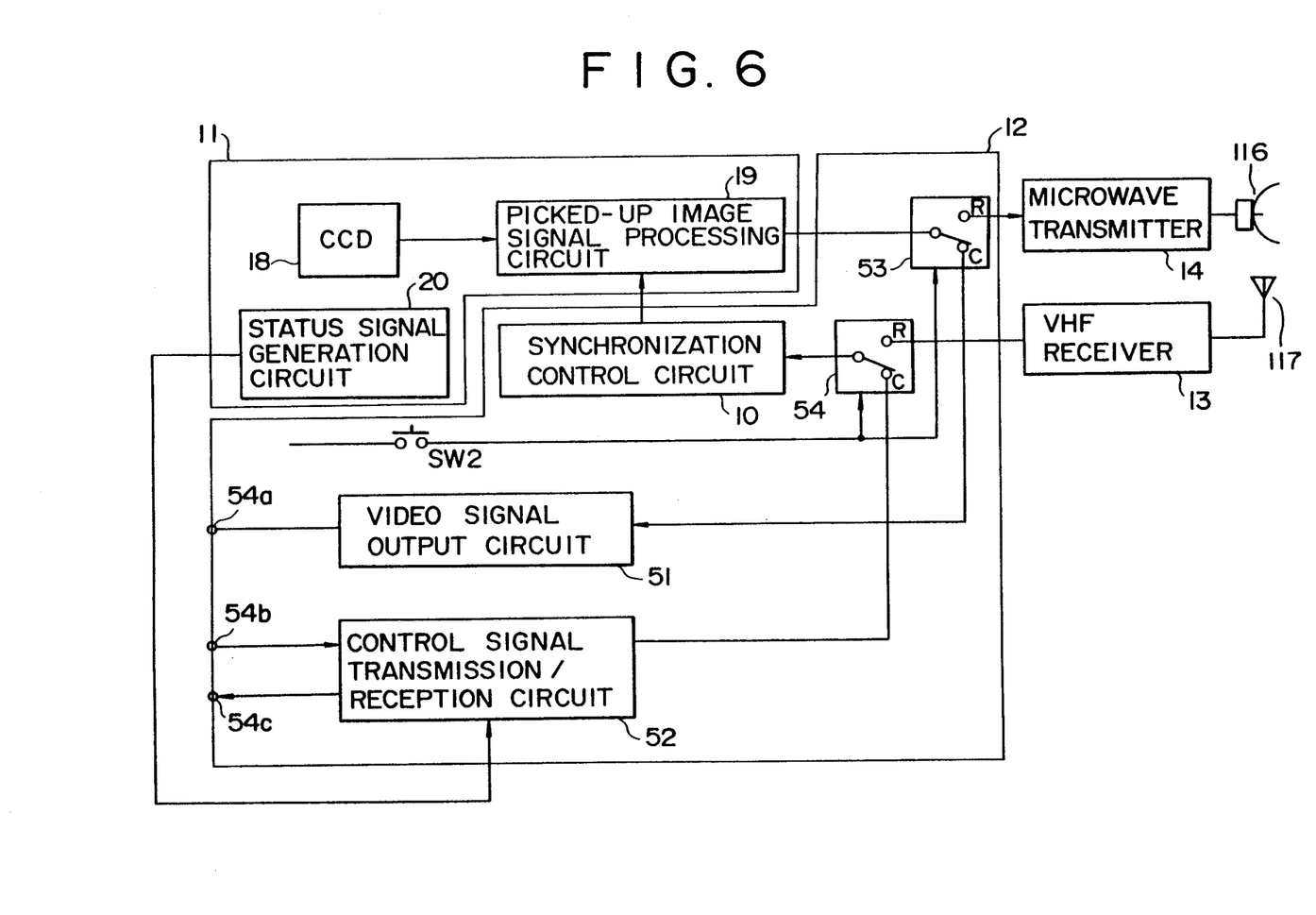
FIG. 6 is a block diagram of a typical video camera according to the invention.

FIG. 6 is a typical block diagram of the video camera according to the invention. The video camera 1 comprises a CCD solid-state image pick-up device 18, a picked-up image signal processing circuit 19, a genlock synchronization control circuit 10, a changeover switch 53, a microwave transmission circuit 14, a VHF reception circuit 13, a control signal changeover switch 54, a video signal output circuit 51, and a control signal transmission/reception circuit 52. The changeover switch 53 switches the output signal of the picked-up image signal processing circuit 19 (i.e., video signal) between two modes: one in which the CCU 7 operates, the other in which the CCU 41 of the radio adapter 4 operates (to be described later in more detail). The video signal output circuit 51 outputs the video signal onto the cable 6.

The microwave transmission circuit 14 modulates the video signal into a microwave band signal for transmission over a microwave channel. The CCU 41, as described, comprises demodulating means for demodulating the microwave video signal back to the initial band video signal. From the CCU 41 of the radio adapter 4, the VHF reception circuit 13 receives control signals in the form of modulated signals transmitted over a VHF band channel for voice communication.

The picked-up image signal from the CCD solid-state image pickup device 18 is supplied to the picked-up image signal processing circuit 19. The picked-up image signal processing circuit 19 also receives a synchronizing signal and a subcarrier from the synchronization control circuit 10. The synchronizing signal and the subcarrier from the synchronization control circuit 10 are synchronized with the reference video signal in accordance with the control signal from the CCU 7 or from the CCU 41 of the radio adapter 4. Thus the output video signal from the picked-up image signal processing circuit 19 is kept under genlock control.

The video signal from the picked-up image signal processing circuit 19 is sent to the changeover switch 53. Under control of a cable/radio switching signal SW2, the changeover switch 53 is set to the output terminal C when the CCU 7 is used for camera control (i.e., cable-based setup); the switch 53 is set to the output terminal R when the CCU 41 of the radio adapter 4 is used (i.e., radio-based setup). Also under control of the switching signal SW2, the changeover switch 54 is set to the input terminal C for the cable-based setup and to the input terminal R for the radio-based setup. These switching operations are illustratively carried out manually.

If the cable-based setup is selected with the video camera 1, a genlock control signal comes from the CCU 7 and appears at the input terminal 54b connected to the cable 6. The genlock control signal is fed to the synchronization control circuit 10 via the control signal transmission/reception circuit 52 and switch 54 for genlock control.

The video signal from the picked-up image signal processing circuit 19 is sent through the changeover switch 53 to the video signal output circuit 51. In turn, the video signal output circuit 51 forwards the video signal to the terminal 54a connected with the cable 6. In this manner, the video signal is supplied to the CCU 7 via the cable 6. In the cable-based setup, a status signal generation circuit 20 in the video camera 1 sends to the terminal 54c a signal indicating camera status such as the diaphragm setting, the terminal 54c being connected to the cable 6. From the terminal 54c, the status signal is transmitted to the CCU 7.

If the radio-based setup is selected with the video camera 1, the control signal received by an antenna 117 is fed to the synchronization control circuit 10 via the VHF reception circuit 13 and switch 54 for genlock control. The video signal from the picked-up image signal processing circuit 19 is supplied via the changeover switch 53 to the microwave transmission circuit 14. In turn, the microwave transmission circuit 14 transmits the video signal via an antenna 116 to the CCU 41.

Below is a description of how the camera control system of the above-described construction works.

When it is desired to have the video camera 1 controlled by the CCU 7, the power switch of the radio adapter 4 is left turned off. In this state, as described earlier, the switches 42 and 43 of the radio adapter 4 are set to the input terminal C and to the output terminal C, respectively. Where the power switch of the radio adapter 4 is turned on, the switch 45 is operated to set the changeover switches 42 and 43 to the input terminal C and to the output terminal C, respectively.

At this time, the control signal from the control panel 5 is sent to the CCU 7 via the changeover switch 43 of the radio adapter 4. The genlock control signal and the camera control signal from the CCU 7 are fed to the video camera 1 via the cable 6 for control of the camera. The genlock-controlled video signal from the video camera 1 is supplied to the CCU 7 via the cable 6. The video signal is fed from the CCU 7 to the switcher 8 via the changeover switch 42 of the radio adapter 4.

When it is desired to have the video camera 1 controlled by the CCU 41, the power switch of the radio adapter 4 is turned on. This enables the switches 42 and 43 of the radio adapter 4 to be set to the input terminal R and to the output terminal R, respectively, as described earlier.

At this point, the control signal from the control panel 5 is sent to the CCU 41 via the changeover switch 43 of the radio adapter 4. The genlock control signal and the camera control signal from the CCU 41 are fed over a radio channel to the video camera 1 for camera control. The genlock-controlled video signal from the video camera 1 is sent to the CCU 41 over a radio channel. The video signal is sent from the CCU 41 to the switcher 8 via the changeover switch 42.

As described, the camera control system of the above construction switches the CCU 7 and CCU 41 when the power switch of the radio adapter 4 is simply turned on and off. There is no need for the physical cable switching that is required conventionally. The switch 45 permits changeover from the currently used CCU 41 to the CCU 7 when the power switch of the radio adapter 4 is turned on.

In the above example, the changeover switches 42 and 43 are operated in conjunction with the power switch of the radio adapter 4. Alternatively, the switches 42 and 43 may be operated manually.

As many apparently different embodiments of this invention may be made without departing from the spirit and scope thereof, it is to be understood that the invention is not limited to the specific embodiments thereof except as defined in the appended claims.

What is claimed is:

1. A camera control unit for communicating with a video camera, said camera control unit comprising:
   means for generating a reference signal having a reference synchronizing portion;
   means for receiving a video signal having a video synchronizing portion transmitted from said video camera over a first radio channel;
   means for comparing the phase of the received video synchronizing portion with the phase of said reference synchronizing portion and for generating a phase difference signal therefrom only when a phase difference between said received video synchronizing portion and said reference synchronizing portion corresponds to at least one of said lines;
   transmitting means for transmitting said phase difference signal to said video camera over a second radio channel; and
   synchronizing means for synchronizing the received video signal with said reference signal so as to obtain a synchronized output video signal, said synchronizing means having storage means for storing the received video signal; means for generating a write clock signal based upon said received video synchronizing portion; means for generating a read clock signal based upon said reference synchronizing portion, means responsive to said write clock signal for writing said received video signal into said storage means so as to store said received video signal therein and means responsive to said read clock signal for reading the stored video signal from said storage means so as to obtain said synchronized output video signal.

2. A camera control unit according to claim 1, wherein said second radio channel has a VHF frequency band.

3. A camera control unit according to claim 1, further comprising means for generating a control signal and encoder means for generating a composite signal of said control signal and said phase difference signal.

4. A camera control unit according to claim 3, wherein said transmitting means transmits said composite signal over said second radio channel.

5. A camera control unit according to claim 1, wherein said means for comparing the phase and for generating a phase difference signal comprises:
   first separating means for separating vertical and horizontal reference synchronizing signals, each having a respective number of data pulses, from said reference synchronizing portion;
   first generating means receiving the vertical and horizontal reference synchronizing signals for generating a first one frame rate signal therefrom;
   a counter for counting the number of pulses in said horizontal reference synchronizing signal, said counter being reset in response to said first one frame rate signal;
   second separating means for separating vertical and horizontal video synchronizing signals from said video synchronizing portion;
   second generating means receiving the vertical and horizontal video synchronizing signals for generating a second one frame rate signal therefrom; and
   latch means for latching an output of said counter in response to said second one frame rate signal so as to generate said phase difference signal.

6. A video camera apparatus comprising:

a camera control unit including first receiving means for receiving a transmitted video signal representing a plurality of lines of video information and having a video synchronizing portion; means for generating a reference signal having a reference synchronizing portion; means for comparing the phase of the received video synchronizing portion with the phase of said reference synchronizing portion and for generating a phase difference signal therefrom only when a phase difference between said received video synchronizing portion and said reference synchronizing portion corresponds to at least one of said lines; first transmitting means for transmitting said phase difference signal over a first radio channel; and synchronizing means for synchronizing the received video signal with said reference signal so as to obtain a synchronized output video signal, said synchronizing means having means for generating a write clock signal based upon said received video synchronizing portion, means for generating a read clock signal based upon said reference synchronizing portion, storage means for storing said received video signal, means responsive to said write clock signal for writing said received video signal into said storage means so as to store said received video signal therein and means responsive to said read clock signal for reading the stored video signal from said storage means so as to obtain said synchronized output video signal; and a video camera including second receiving means for receiving said phase difference signal transmitted by said first transmitting means; means for generating a synchronizing signal and for controlling the phase of said synchronizing signal in accordance with the received phase difference signal; means for generating the video signal in accordance with said synchronizing signal; and second transmitting means for transmitting the generated video signal over a second radio channel for reception by said first receiving means.

7. A video camera apparatus according to claim 6, wherein said first radio channel has a VHF frequency band, and said second radio channel has a microwave frequency band.

8. A video camera apparatus according to claim 6 wherein said camera control unit further comprises means for generating a control signal and encoder means for generating a composite signal of said control signal and said phase difference signal.

9. A video camera apparatus according to claim 8, wherein said first transmitting means transmits said composite signal over said first radio channel.

10. A video camera apparatus according to claim 6 wherein said means for comparing the phase and for generating a phase difference signal comprises:

first separating means for separating vertical and horizontal reference synchronizing signals, each having a respective number of data pulses, from said reference synchronizing portion;

first generating means receiving the vertical and horizontal reference synchronizing signals for generating a first one frame rate signal therefrom;

a counter for counting the number of pulses in said horizontal reference synchronizing signal, said counter being reset in response to said first one frame rate signal;

second separating means for separating vertical and horizontal video synchronizing signals from said received video synchronizing portion;

second generating means receiving the vertical and horizontal video synchronizing signals for generating a second one frame rate signal therefrom; and latch means for latching an output of said counter in response to said second one frame rate signal so as to generate said phase difference signal.

11. In a video camera apparatus including a video camera for generating a video signal representing a plurality of frames of video images, each of said frames having a plurality of lines of video information, and a camera control unit for generating a control signal for controlling said video camera, said camera control unit comprising:

first receiving means for receiving the video signal generated by said video camera;

means for generating a reference signal;

phase comparison means for comparing the phase of the video signal received by said first receiving means with the phase of said reference signal and for generating a phase difference signal therefrom only when a phase difference between the received video signal and said reference signal corresponds to at least one of said lines;

first transmitting means for transmitting said phase difference signal to said video camera over a first radio channel; and synchronizing means for synchronizing said received video signal with said reference signal so as to obtain a synchronized output video signal, said synchronizing means having memory means for storing said received video signal, means for generating a write clock signal in response to said received video signal, means for generating a read clock signal in response to said reference signal, means responsive to said write clock signal for writing said received video signal into said memory means so as to store said received video signal therein and means responsive to said read clock signal for reading the stored video signal from said memory means so as to obtain said synchronized output video signal; and said video camera comprising:

second receiving means for receiving said phase difference signal transmitted by said first transmitting means;

means for generating a synchronizing signal;

means for controlling the phase of said synchronizing signal in accordance with the received phase difference signal from said second receiving means;

means for generating said video signal in accordance with said synchronizing signal; and second transmitting means for transmitting said generated video signal over a second radio channel for reception by said first receiving means.

12. A video camera apparatus according to claim 11, wherein said first radio channel has a VHF frequency band, and said second radio channel has a microwave frequency band.

13. A video camera apparatus according to claim 11, wherein said camera control unit further comprises means for generating a control signal and encoder means for generating a composite signal of said control signal and said phase difference signal.

14. A video camera apparatus according to claim 11, wherein said phase comparison means comprises:

first separating means for separating vertical and horizontal reference signals, each having a respective number of data pulses, from said reference signal;

first generating means receiving the vertical and horizontal reference signals for generating a first one frame rate signal therefrom;

a counter for counting the number of pulses in said horizontal reference signal, said counter being reset in response to said first one frame rate signal;

second separating means for separating vertical and horizontal video signals from said received video signal;

second generating means receiving the vertical and horizontal video signals for generating a second one frame rate signal therefrom; and latch means for latching an output of said counter in response to said second one frame rate signal so as to generate said phase difference signal.

* * * * *